United States Patent [19]

Huvey

[11] Patent Number: 5,064,491
[45] Date of Patent: Nov. 12, 1991

[54] PROCESSES FOR THE MANUFACTURE OF CURVED REINFORCING ELEMENTS

[75] Inventor: Michel Huvey, Bougival, France

[73] Assignee: Institut Francais du Petrole, Rueil - Malmaison, France

[21] Appl. No.: 146,134

[22] PCT Filed: Apr. 7, 1987

[86] PCT No.: PCT/FR87/00112
§ 371 Date: Dec. 8, 1987
§ 102(e) Date: Dec. 8, 1987

[87] PCT Pub. No.: WO87/06184
PCT Pub. Date: Oct. 22, 1987

[30] Foreign Application Priority Data

| Apr. 8, 1986 [FR] | France | 86 05093 |
| Apr. 8, 1986 [FR] | France | 86 05094 |
| Apr. 8, 1986 [FR] | France | 86 05095 |

[51] Int. Cl.⁵ ............................................. B29D 23/22
[52] U.S. Cl. ................................ 156/173; 156/175
[58] Field of Search ............... 264/257, 258; 156/173, 156/175, 143, 144, 166, 169, 171, 172, 174, 176, 178, 180, 181, 184, 185, 187, 188

[56] References Cited

U.S. PATENT DOCUMENTS

| 2,501,283 | 3/1950 | Nilsson | 156/173 |
| 3,387,348 | 6/1968 | Kilgallon | 156/175 |
| 3,497,413 | 2/1970 | Ullman et al. | 156/174 |
| 3,572,023 | 3/1971 | Galonska | 156/173 |
| 3,943,224 | 3/1976 | Drostholm | 156/174 |
| 3,966,388 | 6/1976 | Bonavent et al. | 264/174 |
| 4,074,958 | 2/1978 | Molenaar | 425/71 |

FOREIGN PATENT DOCUMENTS

| 0001894 | 5/1979 | European Pat. Off. . |
| 2049167 | 3/1971 | France . |
| 2312356 | 12/1976 | France . |
| 2088320 | 11/1980 | United Kingdom . |

Primary Examiner—Jay H. Woo
Assistant Examiner—Jeremiah F. Durkin, II
Attorney, Agent, or Firm—Antonelli, Terry, Stout & Kraus

[57] ABSTRACT

A method and device for simultaneously producing a plurality of curved profiled reinforcement bars of a material stabilized by a mold helically wound on a mandrel, with the mold including a plurality of grooves in which are arranged reinforcing elements. The reinforcement bars are disposed on a support, with the support being moved when the bars are set in place to form an armature of a body. When the bars are produced in the mold with the plurality of grooves, the mold is used as a support part or a laying support.

6 Claims, 9 Drawing Sheets

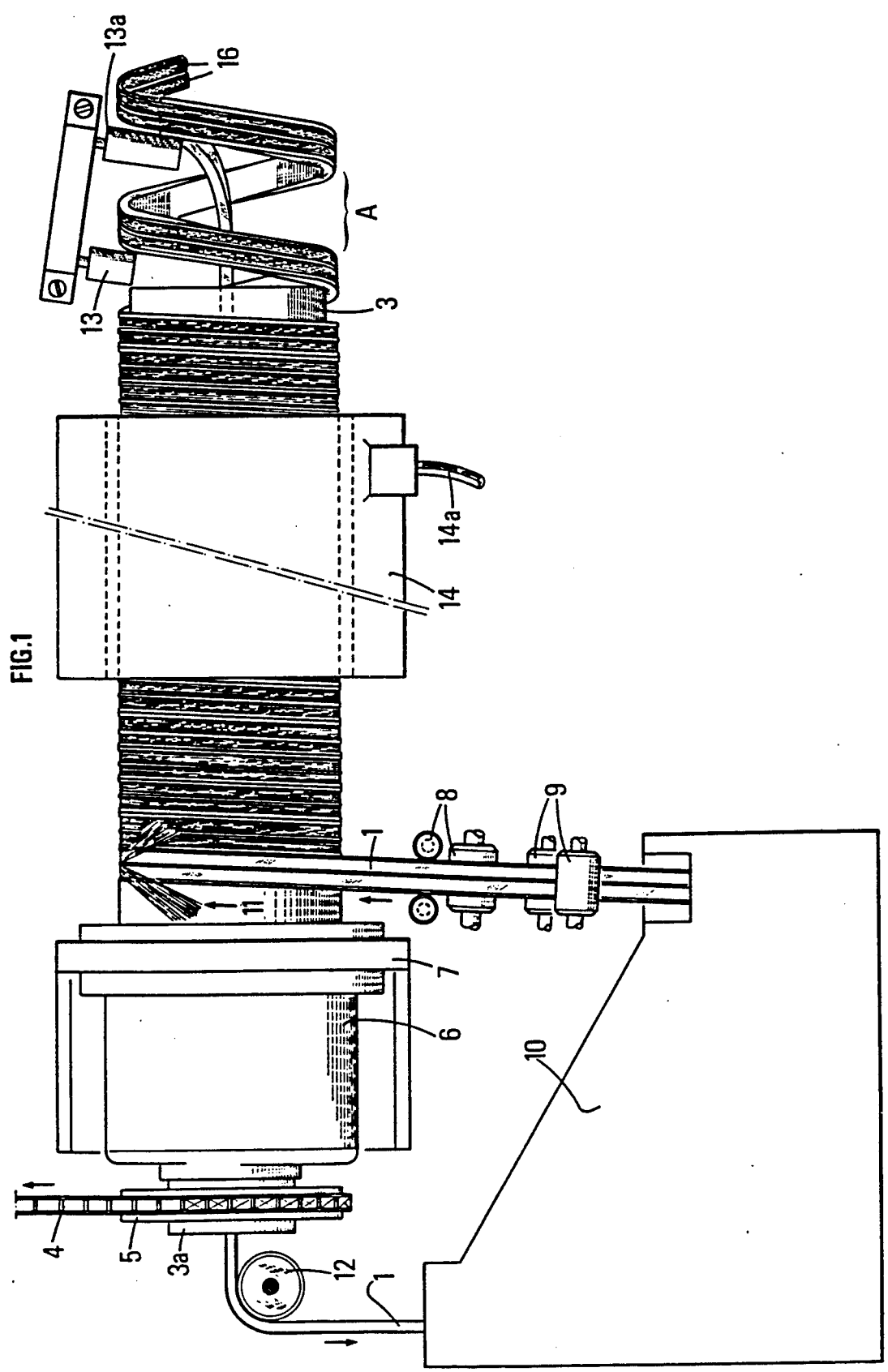

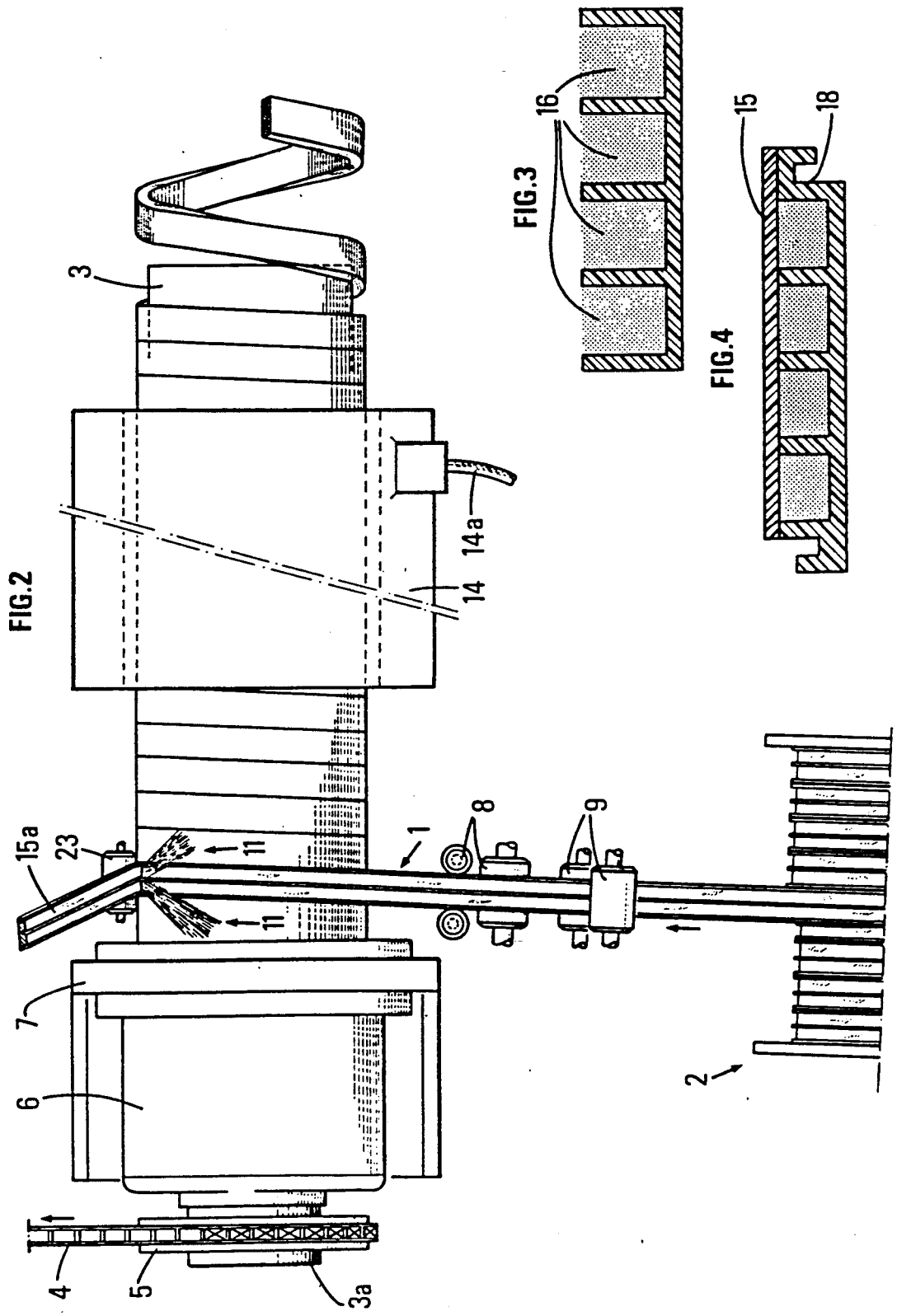

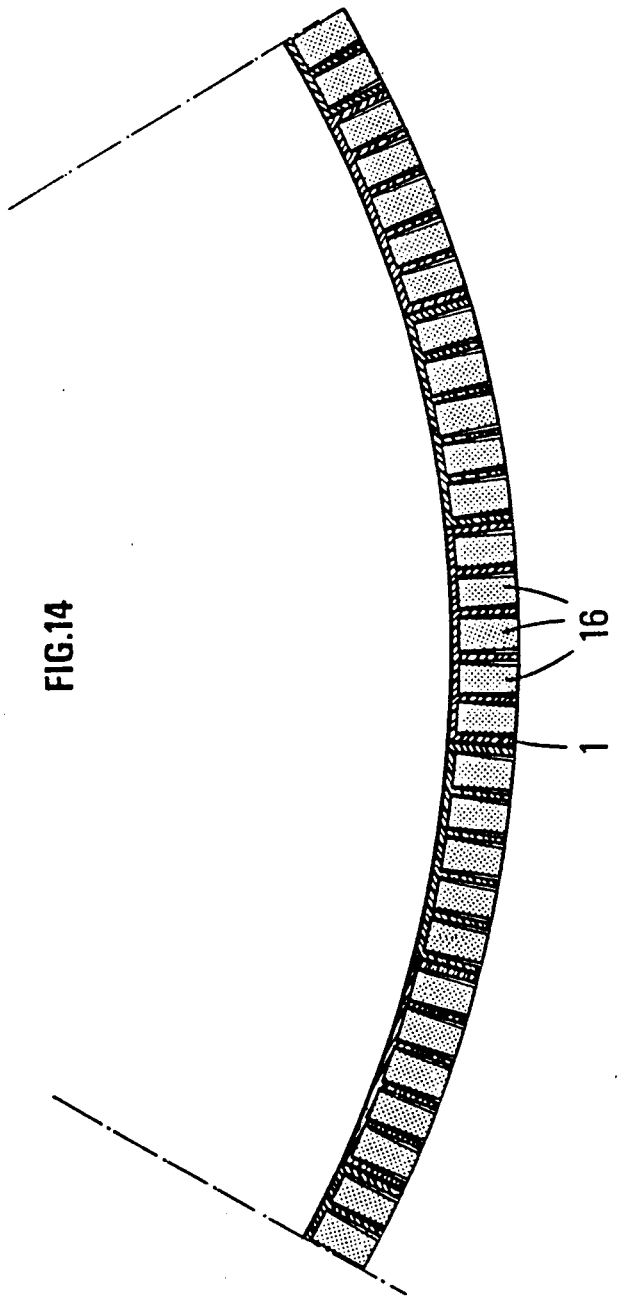

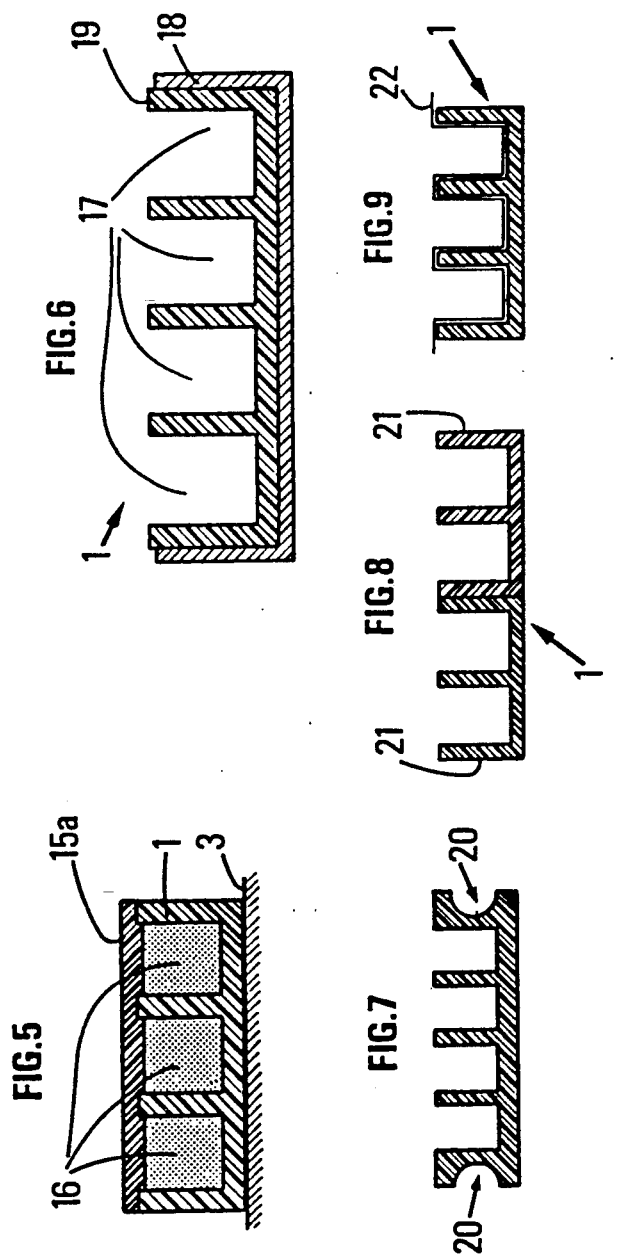

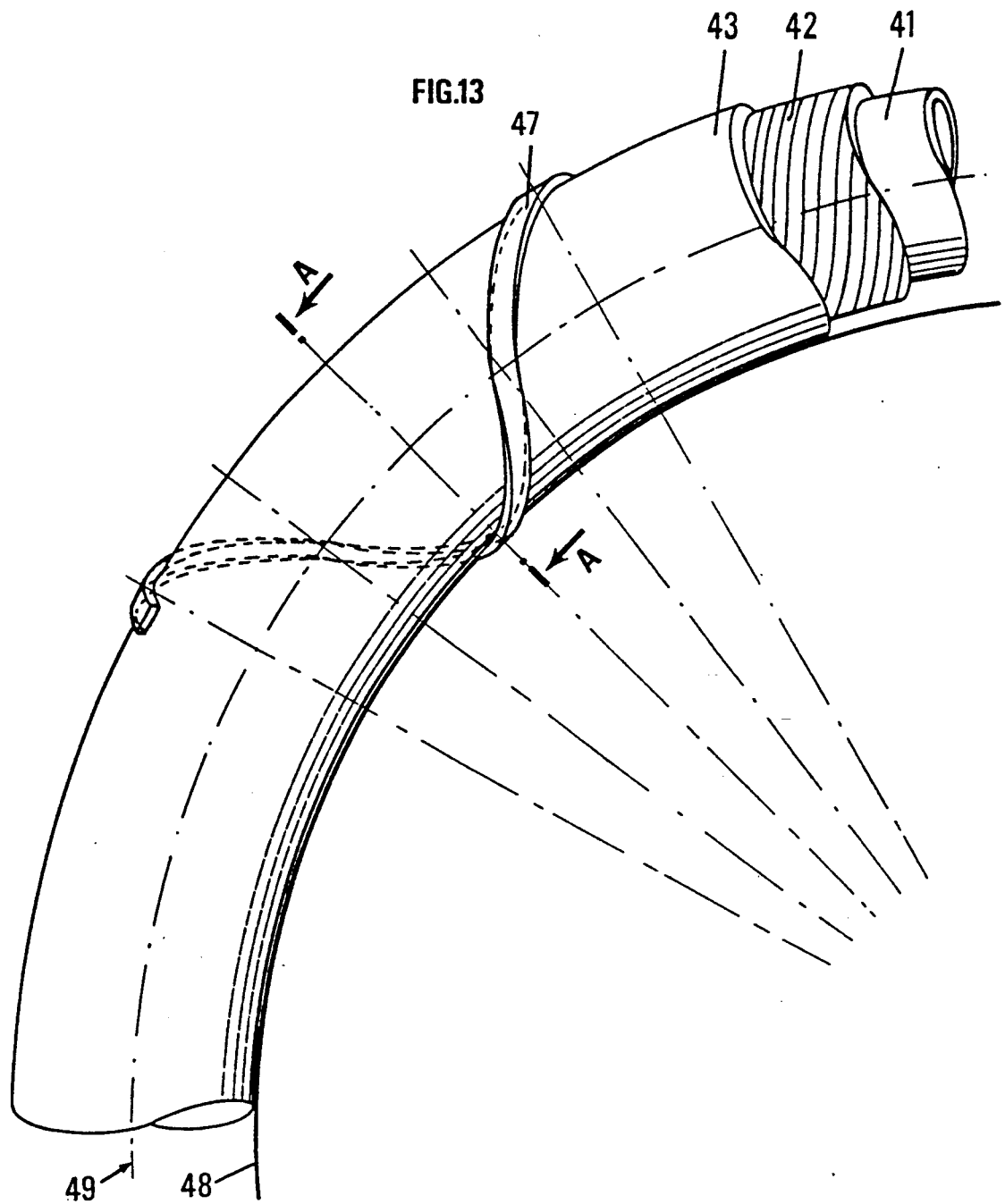

PROCESSES FOR THE MANUFACTURE OF CURVED REINFORCING ELEMENTS

BACKGROUND OF THE INVENTION

The present invention relates to a process employing a shaped supporting mold comprising a plurality of grooves for manufacturing shaped curved bars having a constant or non-constant cross section, made of a material reinforced with filaments, and to a unitized assembly comprising the supporting mold with at least two shaped curved bars.

The present invention also relates to a process and a device for facilitating installation of reinforcing bars in bodies comprising reinforcing sheeting, for bodies of revolution such as, for example, a flexible pipe whose sheeting is composed of a large number of reinforcing bars.

The present invention also relates to reinforced bodies comprising a reinforcing armature made with at least one elongated curved, shaped element reinforced with several bars, such as a supporting mold whereby the reinforced bodies can be lightweight, flexible, tight pipes having reinforcing armatures designed to withstand tractive forces and having a high degree of resistance as a result of helical winding of the shaped bars.

In for example, French patent A2 312,356, a shaping of reinforced plastic material is proposed wherein a filament mixture with a high resistance to tractive force, such as fibers of glass, carbon or organic material, and a cross-linkable plastic is added to a shaped groove forming a mold, with the shaped groove being wound on a wall of an mandrel or drum, and with the shaped element being extracted from the shaped groove after at least a partial cross-linking resulting, for example, from a heat treatment.

With the above-described proposed technique, during the production of shaped curved bars, the length of the bars produced by machine levels off rapidly because the rotational speed of the mandrel or drum is limited, primarily to reduce operating expense by using a classical impregnation technique.

In addition, the widths of the shaped curved bars that is, the dimension of the cross section along the perpendicular to the radius, with the thickness being defined as the dimension of the cross section in the direction of the radius, which in manufacturing determines the advance of the bar per turn on the mandrel, with the advance per turn being essentially equal to the width of the mold or rather the width of the bar plus the width or thickness of the radial wails of the mold directly affects the productivity of the manufacturing machine.

Thus, at a certain rotational speed such as, for example, a maximum rotational speed, or for a certain bar length production rate, the narrower the bar, the slower the rate of production of bar covering surface (the width of the bar multiplied by the length produced per unit time), and consequently the less the machine produces.

If several shaped curved bars are produced simultaneously on the same mandrel, the length of bar actually obtained is the same as the sum of the lengths of all the bars produced. Thus, production is multiplied by a factor essentially equal to the number of bars produced simultaneously, since the stabilization means such as heating can be adapted easily for such an increase in production without presenting any significant problems related to this increase and also knowing that in the case of very narrow shaped curved bars, these stabilization means are often sufficient.

This simultaneous production of several bars can be obtained by using a shaped and elongated supporting mold which comprises essentially parallel grooves running along the longitudinal axis to permit the bars to be molded at least to the cross section of the grooves, with at least one groove being partially fillable.

In addition, the use of a multi-groove supporting mold makes it possible to reduce the thickness of the supporting mold between the grooves relative to a sum of the two thicknesses of mold to a single groove, as described in French Patent A 2,312,356.

Thus, by reducing the width of the supporting mold, the cost of the mold, generally made of a heavy material can be reduced and the number of turns of the bars on the mandrel, particularly in a stabilization zone, can be increased.

Thus, at a given rotational speed of the mandrel or rate of covering surface production, by using a multi-groove mold, it is possible to have a stabilization time longer than a stabilization for manufacturing the same number of bars simply by joining several single-groove molds, with each single-groove mold shaping one bar.

On the other hand, if the shaped supporting mold which simultaneously produces several curved bars is made in one piece, this shaped supporting mold will act like a unitized assembly which is very easy to handle after the bars have been stabilized.

Stabilization is construed to be a physical or chemical process such as melting with cooling or cross-linking which allows a body referred to as stabilizable, to assume a stable form. Thermoplastic, thermosettable, or elastomeric materials, for example, are stabilizable bodies.

The multibar unitized assembly described above is particularly useful from the standpoint of storage and handling, since it is possible to reduce the number of storage reels by virtue of the fact that, unlike conventional proposals, it is not necessary to provide as many reels as curved bars. Moreover, entanglement of curved bars during handling, which a natural tendency of the curved bars, particularly in the manufacturing of all flexible tubing is avoided. This is especially valuable for manufacturing any elongated bodies, and, in particular, bodies of revolution, including numerous narrow bars, such as elongated shaped elements.

Moreover, the unitized assembly according to the invention, containing several bars nevertheless behaves as a single wide bar when stranding a flexible tube thereby making it possible to retain all of the advantages of wide bars and in certain cases to justify the use of a shaped supporting mold comprising a large number of narrow bars, that is bars having a height greater than a width thereof.

Thus French Patent A 2,210,266 and corresponding U.S. Pat. No. 4,013,100 demonstrate the value of the flexibility of reinforced flexible pipes and for reinforcing sheeting resistant to tractive effort obtained by using curved reinforcing bars whose moment of inertia of the cross section relative to an axis passing through its center of gravity and perpendicular to the radius of curvature is greater than all the other moments of inertia of the cross section relative to another axis passing through the center of gravity.

Such a requirement therefore means, for example when using shapes with a rectangular cross section, that the height of the curved bar, that is, the dimension of the cross section along a radius, must be greater than its width or dimension of the cross section along a perpendicular to the radius. However, since the thickness of the reinforcing sheeting or the height of the reinforcing bars is a given, this implies a reduction in the thickness of the bars comprising the sheeting, or an increase in their number.

Thus, increasing the number of bars or wires, when the reinforcing bars are laid to manufacture the body comprising the reinforcing sheeting results in an increase in the number of dispensing reels for these bars, in the material, and the adjustments.

If one attempts to place several wires side by side on the same reel, experience has shown that tangles result in a short time when unreeling. Moreover, it is necessary for the bars to be shaped very exactly and bent before laying in order to ensure the sitting of the bars without sagging.

The process and the device for laying reinforcing bars according to the present invention makes it possible in particular to preserve the advantages of using wires that are taller than they are wide, while avoiding the disadvantages associated with the laying of such wires.

The process and the device for laying reinforcing bars according to the present invention make it possible in particular to sheathe a tube using a conventional sheathing machine, without any expensive modification or the need for high precision regulation.

In general, an elongated shaped support which maintains the reinforcing bars parallel to one another and in the same orientation, is then used to produce a unitized assembly which is very easy to handle, allowing the bars to be wound onto the reels of the sheathing machine, unwound, and laid on the flexible elongated body with considerable ease and safety. The term orientation means that all the centers of curvature of the curved bars located on any cross section of the support will be on the same side of the support from either above or below.

The reinforcing bars can be assembled by the shaped support, for example, either when the reinforcing bars are being preshaped, or immediately afterwards if working with metal bars made, for example, of steel, or during the manufacture of the bars, for example, when the bars are made of a plastic material reinforced with filaments that have a high resistance to tractive effort.

In accordance with the present invention, the unitized assembly formed as described above is wound on a reel before being mounted on the sheathing machine thereby greatly facilitating the manufacturing process.

The process and device for laying of reinforcing bars in accordance with the present invention are particularly useful for manufacturing curved bars from a reinforced plastic since a number of the curved bars can be simultaneously manufactured in a one-piece mold which supports the curved bars for subsequent winding of the curved bars with reinforcing sheeting.

Thus, by virtue of the features of the present invention, it is possible to eliminate an additional step involving the laying of a support before winding thereby increasing the benefits associated with a mold which is simultaneously used to manufacture several bars.

The process of laying reinforcing bars according to the present invention includes using one or more unitized assemblies which are mounted on one reel or as many reels as are necessary for the sheeting machine, with the unitized assemblies being composed of reinforcing bars joined by the support mold. The assemblies are unreeled and laid in the same manner as a strip or wide shaped member is laid on a core of a pipe to be wrapped, and the support is withdrawn when the bars are no longer in danger of becoming entangled with one another.

With metal reinforcing bars, a supplementary operation is required, namely, assembling the bars on a shaped support with several grooves; however, the features of the present invention are very advantageous in certain cases for a number of bars to comprise a unitized assembly when they are laid. Thus, when many bars must be simultaneously wrapped, the number of reels on the winding machine can be considerably reduced.

More particularly, in the manufacture and use of bars made of reinforced plastic, but without the use of this type of support being limitative, the support can be shaped and elongated and comprise essentially parallel grooves and extend along the longitudinal axis to permit the bars to be molded at least to the groove's cross section and at least one groove can be partially filled. The support can be the supporting mold described above and serve for making the bars. In the same way as the multibar unitized assembly is used to install the reinforcing sheeting by means of a sheeting machine with recycling of the multi-groove supporting mold, the flexible tubing or elements comprising reinforcing bars made of reinforced composite materials can be made by using unitized elements such as the shaped supporting mold mentioned above, containing shaped curved bars.

The present invention also proposes an elongated body comprising at least one curved elongated shaped element reinforced with several reinforced curved bars. This multibar shaped element is used in a reinforcing sheeting and has a mechanical behavior at least as good as that of the bar assembly composing them and usable in assembling reinforcing sheeting for a reinforced body. This shaped element also offers a number of advantages over a set of bars used independently of one another.

These advantages include ease of manufacture, ease of handling for manufacturing reinforcing sheeting, and higher production rate, all of these elements being reflected in financial advantages to which may be added the possibility of obtaining anti-wear shapes using less antiabrasion material, and shapes using a type of sheeting which is less expensive than the shapes according to the prior art.

More specifically, the shape is composed, for example, of an elongated shaped supporting element with a constant or non-constant cross section comprising several grooves separated by walls and having the shape of a comb in cross section, and with several curved bars located inside said grooves.

The curved bars can be made, for example, of a stabilizable material and may contain reinforcing filaments resistant to tractive effort.

The profiled element is particularly applicable when used to manufacture bodies comprising reinforcing armatures such as sealed pipes, cables, and bodies of revolution.

To explain the invention in a non-limitative manner, a flexible pipe may be considered which comprises armatures resistant to pressure and/or traction forces, with the flexible pipe serving to convey a fluid such as, for example, a hydrocarbon. Flexible pipes of this type are generally subjected to significant tractive forces either when the flexible pipes are installed, especially, when laid on a seabed, or during use of the flexible pipes.

The flexible pipes which can be used for this purpose generally comprise a flexible tight tubular core which can be composed of an elastomer or plastic material, at least one pressure-resistant armature, and at least one armature resistant to tractive and/or torsional forces applied to the pipe, with the pipes also comprising one or more sealing sheaths.

The armatures are formed by helical windings or by rings, wires, strands, bars, or shapes of metal or reinforced cross-linkable material in a manner as described more fully in French Patents 2,312,356 and 2,283,768 corresponding to U.S. Pat. No. 3,966,388.

In the reinforcing sheeting which comprises the flexible pipes, the reinforcing bars have a certain degree of mobility with respect to one another, and the present invention makes it possible to retain the advantage associated with this relative mobility of the bars, but to eliminate the disadvantages.

If the bars are movable with respect to one another in the supporting element, and if this element is designed to be elastic, the bars will not be mechanically linked to one another and, in traction, torsion, and flexion, will exhibit behavior similar to that of the bars in the absence of the supporting element.

If the bars adhere to the supporting, element, the supporting element must be highly deformable and, if the bars are free to slide in the grooves in the supporting element, the supporting element must have less deformation.

The construction of the supporting element with less deformation is preferable since the supporting element is under less mechanical stress but may, in a manner described more fully hereinbelow, integrate one or more bars or surface areas of the bars with the supporting element to distribute wear over the surfaces in motion.

Preferably, according to the present invention the shape notably offers the advantage of being simple to produce when the supporting element is used to produce several reinforcing bars. This possibility of a dual purpose option only exists if the supporting element is simultaneously adapted for the requirements of sheeting used for reinforcing reinforced elongated bodies and the requirements associated with manufacturing curved bars reinforced with the composite material.

In general particularly when the supporting element is used as a mold for manufacturing bars, the supporting element will be referred to as a supporting mold.

Using the supporting element as a mold and support eliminates the unmolding process and cleaning operations such as eliminating dirt particularly, when using fiberglass. If it is desired to recycle the supporting mold. Moreover, it is easier to handle the shaped bars because the shaped bars are assembled into a unitized assembly which becomes more advantageous as the bars composing the assembly become narrower and hence more numerous. This in turn, makes it easier to wind the assembly, especially as the number of shapes to be laid simultaneously decreases, and when correctly used, does not impair the mechanical characteristics of the reinforced elongated bodies that comprise the assembly.

French Patent 2,210,266 provides an example of the advantage, for the stability of the sheeting, of making the traction-reinforcing sheeting of flexible tubing using shaped bars, whose moment of inertia of a cross section relative to a transverse axis passing through the center of gravity of the section is greater than that of the moments of inertia measured relative to other axes passing through the center of gravity or, in other words disposed on a pipe in such fashion that its radius passes through the center of gravity and is perpendicular to the transverse axis.

However, the manufacture and production of such pipes are generally very difficult due to the large number of shaped bars used, especially when shaped reinforcing bars having a rectangular cross section with a narrow width and a large height.

The present invention overcomes this disadvantage among others by proposing a unitized assembly or multi-bar shape which is easily laid (smaller number, fatter shape), which behaves in the reinforced elongated bodies like an assembly of independent bars and which saves on antiabrasion materials as well This can be accomplished by using an antiabrasion supporting mold which prevents wear on the bars. This type of antiabrasion protection is proposed in, for example, French Patent 2,494,401 and corresponding British Patent 2,088,320, wherein a mold groove serves as an antiabrasion lining. A supporting mold according to the invention made of an antiabrasion material makes it possible to reduce the quantity of material which is expensive because the thickness of the inside walls of the supporting element is less than the sum of the thicknesses of the adjacent walls of antiabrasion protection of two bars according to French Patent 2,494,401. The saving of material increases as the number of bars in a supporting element increases.

It is also possible to attach to the shape an element which acts as a lid to protect the bars against wear on their outer surfaces or open face of the supporting mold.

When a multi-rod shape is used, and especially when the multi-rod shape is antiabrasion in nature, the wear on the supporting mold and the bars should be distributed as much as possible and, for this purpose, one or more parts of one or more bars of the mold support may be joined by any suitable means.

The part or parts to be joined may be a vertical or horizontal surface or surfaces inside the supporting mold or may be a narrow zone of the vertical or horizontal surface which extends in a longitudinal direction. A vertical surface is a surface parallel to the radii of the circles osculant to the shape and the horizontal surface is a surface perpendicular at every point to the osculating radius passing through this point.

This could be accomplished, for example, by making integral with the supporting mold an entire bar near a center of the supporting mold, a single vertical surface near the center of the supporting mold, or several vertical surfaces not belonging to the same internal partition of the supporting mold, or the central zone of the bottom of one or more grooves in the supporting mold. This immobilizing surface or surfaces extend or extends longitudinally along the supporting mold, in a continuous or discontinuous manner.

The above-identified shape allows tight sheeting to be applied, and, is for this purpose it is sufficient for the edges of the supporting mold to be provided with recesses which, upon juxtaposition of two shapes of this type or of two consecutive turns of the same shape, would define a confined space which could be lined with an elastic material to provide tightness, adhering to the walls of this confined space and permitting considerable deformation.

Shapes to provide the sealing sheeting have already been described in, for example, French Patent 2,210,267 and corresponding U.S. Pat. No. 3,858,616.

Because of its width, the shape can also reduce the size of the confined spaces and the shape lends to stability to reinforcing sheeting on flexible pipe subjected primarily to flexion.

Since this phenomenon is particularly apparent when using flat bars, the effort exerted on the flexible material can allow bars not held by reinforcing sheeting to shift, causing harmful disorganization that could cause the flexible pipe to leak.

The proposed shape opposes this movement by means of grooves in the supporting mold which resist shifting of the bars and thus ensure improved stability of sheeting.

Like the self-locking bars mentioned in French Patent 2,210,267, the multi-bar shapes according to the invention can have lateral forms which permit self-locking of the shapes when two turns are adjacent.

The self-locking obtainable by the present invention is important to the stability of the reinforcing sheet among other things. The formation of the sealing sheeting such as, for example, sheeting resistant to pressure (tightness can be produced easily between complementary lateral shapes, for example, by gluing or applying an adhesive material), in the manufacture of pipe comprising only a single shaped sheet.

In the manufacture of reinforced hollow bodies, the shape may also have the base of the supporting mold pointing toward an interior of the hollow body rather than toward the outside.

When handling the multi-bar shape, it may be desirable for the bars to be held securely in the grooves of the supporting mold. This can be accomplished by immobilizing the bars, temporarily, for example, by gluing, and adjusting a degree of adhesion so that the bars will come loose from the supporting mold beyond a certain threshold of restraint.

To facilitate relative displacement of the bars with respect to one another, lubricating materials may be used which act immediately or only while the reinforced body is being used.

The invention provides a process for continuous manufacturing of shaped, bent, reinforcing bars with a constant or changing cross section or made of a reinforced stabilizable material, produced inside a shaped supporting mold, wound on a mandrel and containing reinforcing elements impregnated with stabilizable resin, before the stabilized resin is stabilized over at least a portion of the length of said mandrel. The supporting mold comprises several grooves in which the reinforcing elements, impregnated with stabilizable resin, thus produce simultaneously on the same mandrel, several curved bars with a shaped section made of reinforced stabilizable material.

Means may be provided for enabling the bars, once produced and placed in the supporting mold, to be relatively displaceable with respect to one another, and a one-piece supporting mold may be used to produce the bars.

The bars may be removed from the shaped supporting mold after stabilization, with the supporting mold being adapted for enabling separation of the shaped bars. Moreover, the shaped supporting mold could be continuously recycled once the bars are removed.

The stabilizable material comprising the bars could be caused to adhere to the inside wall of at least one groove in the supporting mold, or the stabilizable material may be formulated so as not to adhere to certain interior walls of the grooves in the support mold. Additionally, a shaped supporting mold may be used in an outside wall made of materials resistant to abrasion.

Additionally, a supporting mold may be used composed of two superimposed parts, with one part being separate from the other part after performing at least a partial stabilization of the resin in the curved bars.

After lining the grooves in the shaped supporting mold, the grooves may be covered with at least one element forming a lid, prior to stabilization and separated from the mandrel in the form of a unitized assembly including the entire shape, lining, and the element forming the lid. The element forming the lid may have a section adapted to allow the lid to fit onto the shaped supporting mold.

The invention also provides a shaped supporting mold for continuous manufacture of curved bars with a shaped cross section from a reinforced stabilized material produced inside this supporting mold in which the reinforcing elements impregnated with stabilizable resin are placed, with the supporting mold being wrapped around a mandrel and the resin being stabilized over at least a portion of the length of said mandrel This supporting mold may include several essentially parallel grooves with cross sections corresponding respectively to those of the various shaped bars to be simultaneously produced.

At least one groove of the supporting mold may have a height greater than a width thereof and may have edges adapted so that two adjacent helically wrapped turns can be hooked together. The invention also provides a process for continuously laying the reinforcing armatures of flexible elongated bodies, with the armatures being composed of several curved reinforcing bars.

According to the invention the laying machine is powered, with at least one unitized assembly composed of several bars grouped on a support, and the support is removed during the laying of the bars to form the armature. However, it is also possible to remove the bars before and during a laying of the reinforcing armature.

The support bars can be separated in a zone where the bars, pulled from the support or present in the support, are stretched. Moreover, the support bars may also be removed before the support bars constitute the reinforcing armature. Additionally, prior to feeding the unitized assembly to the laying machine, the support bars comprising the assembly may be placed on a support. Furthermore, once the support bars have been bent, the support bars may be grouped.

The invention also provides a device for continuously laying the reinforcing armatures of the flexible elongated bodies using at least one unitized assembly comprising several reinforcing bars grouped by a support with means being provided for permitting the reinforcing bars to be separated from the support. Of course, this operation is performed after eliminating the risk of tangling of the reinforcing bars with one another. This occurs primarily once the bars are laid on the elongated body or when the bars are placed in tension before being laid on the elongated body, or they are sufficiently close to the elongated body so they cannot tangle with one another.

The device of the present invention may comprise means for storing the support after using it for laying of the reinforcing armature, as well as means for storing and for supplying the unitized assembly for laying the bars. Additionally means for applying tension to the bars while they are being laid may be provided, with the tension applying means being operable at a level of the means for storing and supplying the unitized assembly. Furthermore, a bar-arranging grid may be provided for forming the armature.

The invention also provides a support for grouping the bars and keeping the bars aligned in a certain direction with the support comprising several separate elements.

The present invention also provides a flexible elongated body comprising at least.. one reinforced bent elongated shaped element, with reinforced bent elongated shaped element including a supporting element comprising several grooves essentially parallel to one another and extending along the longitudinal direction of the shaped element. At least two of the grooves each have one reinforcing bar, itself comprising filaments embedded in a stabilized material, and the supporting element is wrapped in a helix.

The bars may shift relative to one another as the flexible elongated body is used, and the shaped element may have at least one groove which has a height greater than a width thereof. Moreover, a base of the supporting element may be directed toward an interior of the elongated body, and the shaped element may comprise means for sliding at least one bar in the groove.

The shaped element may have a section adapted so that two adjacent turns of at least one of these shaped elements, wrapped helically, can delimit between the adjacent turns a confined space which may be filled by an adhesive elastic material.

Advantageously, according to the present invention, an element forming the lid may cover the supporting element lined with bars and form a unitized assembly with the shaped element. Additionally, the shaped element, possibly covered, may be composed of parts made of plastic. Moreover, the shaped element, possibly covered, may be composed of parts made of an abrasion-resistant material. Also a thickness of internal walls of the supporting element may be at most equal to a thickness of the outside walls of the supporting element.

The invention also provides a multi-bar shape comprising a supporting part with several grooves running essentially parallel to one another and extending in the longitudinal direction, with at least two, of the grooves each containing a reinforcing bar.

This multi-bar shape is characterized especially by the bars being adapted to shift relative to one another during use of said shaped element.

At least one bar can be made integral with the supporting element along one or more zones of a vertical or horizontal surface of a groove in the supporting element, with the zone or zones extending longitudinally in the supporting element in a continuous or discontinuous fashion.

The supporting mold may be adapted to serve as a support for the implementation of the laying process with recycling of the supporting mold or to serve as a supporting element for grouping the bars when assembling flexible elongated bodies.

BRIEF DESCRIPTION OF THE DRAWINGS

FIG. 1 is a schematic view of an operating production device for manufacturing shaped bars in accordance with the present invention;

FIG. 2 is a schematic view of an operating production device for manufacturing a unitized assembly in accordance with the present invention;

FIG. 3 is a cross-sectional view of a multi-grooved shaped supporting mold constructed in accordance with the present invention;

FIG. 4 is a cross-sectional view of a self-hookable shaped supporting mold provided with a lid means;

FIG. 5, is a cross-sectional view of a shaped supporting mold including reinforcing bars and covered with a locking cover;

FIG. 6 is a cross-sectional view of a multi-grooved shaped supporting mold reinforced by a separable lower part;

FIG. 7 is a cross-sectional view of a shaped supporting mold with lateral recesses;

FIG. 8 is a cross-sectional view of a double-shaped mold;

FIG. 9 is a cross-sectional view of a shaped mold lined with a film subjected to an adhesive treatment;

FIG. 13 is a schematic prospective view illustrating a theoretical deformation of one shaped traction-resistant armor bar in the flexible pipe of FIG. 12;

FIG. 14 is a partial cross-sectional view through a sheet of a traction-resistant armature of a flexible pipe composed of multi-rod shapes in accordance with the present invention.

DETAILED DESCRIPTION

Figure 10:
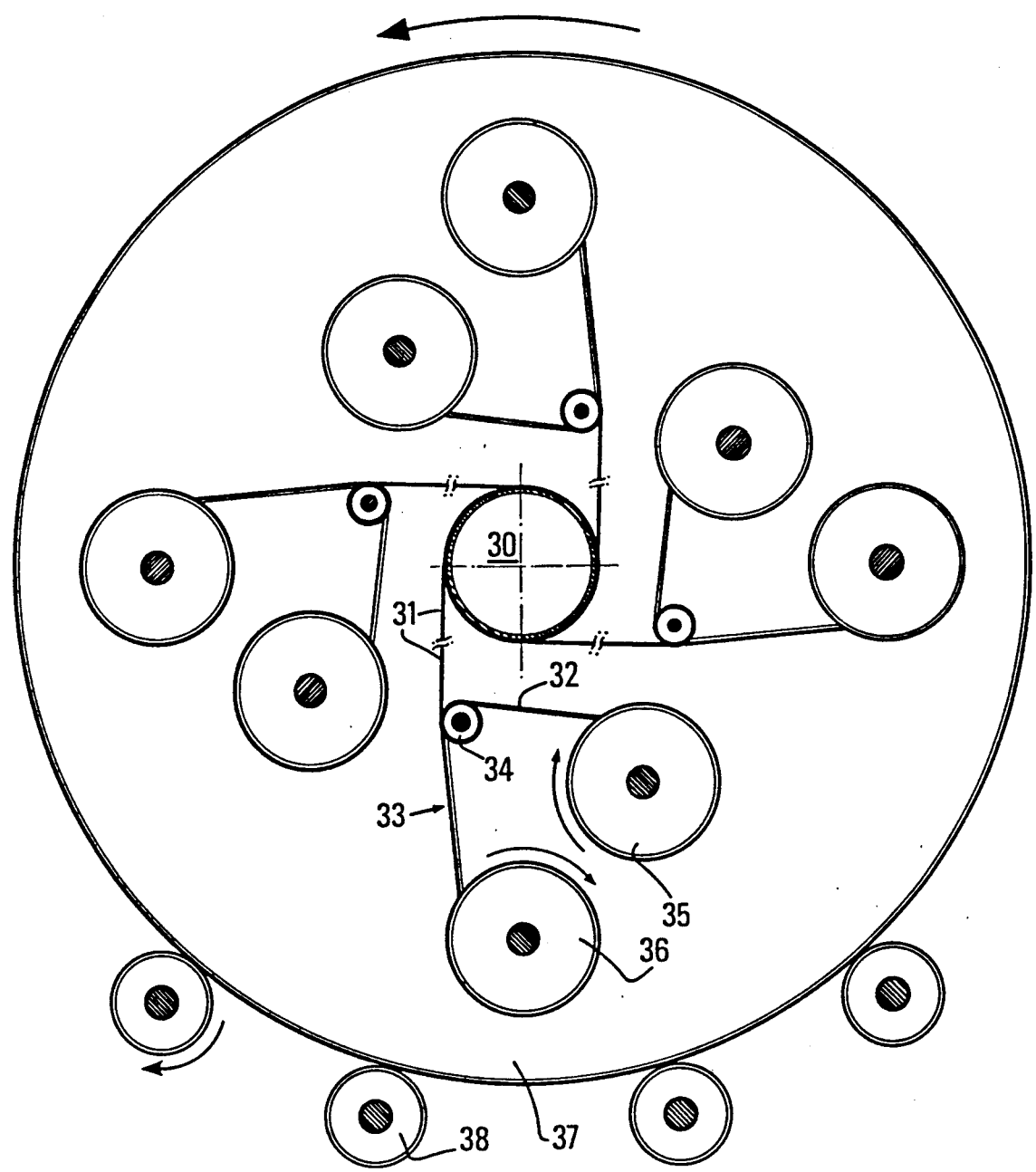
FIG. 10 is a schematic view in a direction of an axis of a flexible elongated body or shape illustrating a laying process in accordance with the present invention for bars in the manufacturing of a reinforcing sheeting.

Referring now the drawings wherein like reference numerals are used throughout the various view to designate like parts and, more particularly, to FIG. 1, according to this figure, a hollow shaped supporting mold 1 is wound on a mandrel 3, with the supporting mold 1 being adapted to manufacture shaped bars 16 from stabilizable plastic material using a supporting mold 1. Before being wound on the mandrel 3, the shaped supporting mold 1 passes through guide rollers 8 and tension rollers 9 and, subsequently, the supporting mold 1 is separated from the mandrel to enable a recycling of the support mold 1.

As shown in FIG. 2, the supporting mold 1 is separated from the shaped bars 16 as soon as the shaped bars are fabricated and an element 15 may be provided which forms a lid adapted to be placed on the supporting mold 1.

While FIGS. 1 and 2 illustrate the large face of the supporting mold 1 resting against the mandrel 1, it is also possible for the peaks of the partitions of the supporting mold 1 to be constructed so as to rest against the mandrel 3. The drum or mandrel 3 includes a shaft 3a connected to a drive means for rotating the drum or mandrel 3, with the drive means comprising, for example, a chain 4 engaging a toothed pinion 5 fitted on the shaft 3a. The shaft 3a is rotatably supported in a bearing 6 through roller bearings, with the bearing 6 being integral with a frame 7.

As shown in FIG. 3, the supporting mold 1 has several longitudinal grooves, which, as drum 3 is rotated, are filled with highly resistant filaments or rovings 11 previously impregnated with a stabilizable plastic material which can or cannot adhere to the inside walls of the grooves depending on their position in the supporting mold 1 and intended purpose, and capable of adhering to the filaments or rovings 11. This mixture of filaments and stabilizable plastic material forms cores 16 of the shape which, alter stabilization, become the reinforced bent bars.

The thus lined shaped supporting mold 1 then passes into a furnace 14 and is subjected to a heat treatment to stabilize the reinforced plastic material, with the furnace 14 being supplied with energy by any appropriate means such as, for example, a cable 14a if electrical heating means are employed.

In FIG. 1 following at least partial stabilization of the stabilizable material which comprises bars 16, shaped curved bars 16 formed by molding are extracted from shaped mold 1. This extraction process is carried out, for example, at a point located at the outlet of the mandrel, by curving the shaped supporting mold 1 around rollers 13 and 13a toward the axis of the mandrel 3 and allowing the shaped supporting mold 1 to pass into the mandrel 3 and then into shaft 3a toward the left of the FIG. 1, both of which will have been drilled out. However, it is also possible to bring the groove of the shaped supporting mold 1 directly between the groups of bars formed, for example, in the space A shown in FIG. 1.

Reinforced curved bars 16 extracted from shaped supporting mold 1 are sent to a storage location such as, for example, a reel, or a place where the shaped supporting mold 1 will be used. The shaped supporting mold 1, which passes over roller 12 at its exit from driveshaft 3a, can either be stored or continuously recycled after passing through a device 10 for cleaning the mold 1 in a suitable fashion. The thus produced bars can be utilized to make strong light-weight pipe.

As a non-limiting example, a hollow mold has been made with three grooves 17 forming three identical molds with a rectangular cross section measuring 5 mm×7 mm and an external wall thickness and an internal partition thickness of 1 mm. This supporting mold is made of polyamide 11 generally known by the Trademark RISLAN by a conventional extrusion process.

This groove has been filled with a mixture of 70 parts by weight of continuous fiberglass roving, unidirectional and non-twisted and 30 parts by weight of a mixture of epoxy resin of bisphenol A diglycidly ether A (100 parts) and p,p'-diaminodiphenylmethane (27 parts by weight).

To facilitate separating the bent bars produced from the mold, antiadhesion products may be used such as a mold-removal agent of a type currently in use in the plastics industry, before filling these grooves with filaments and stabilizable plastic materials, or with one or more sheets 22 (FIG. 9) which do not stick to the supporting mold 1 but do stick to the core and which conform to the internal shapes of the supporting mold.

As shown in FIG. 2, the shaped supporting mold 1, supplied from a supply reel 2 passes between the guide rollers 8 and tension rollers 9 and is filled with the filaments. Prior to entering the furnace 14, the supporting mold 1 may be covered by an element 15, 15a to form a lid. The cover may be composed of a strip of plastic material as shown in FIG. 4 or, as shown in FIGS. 2 and 5, the cover may take the form of a shaped element 15a having a cross section allowing the element 15a to fit on the shaped supporting mold 1 before a heat treatment in the furnace 14. A roller 23 presses the shaped element 15a against the shaped supporting mold 1 to attach the element 15a to the mold 1 and, a slight pull on the element 15a, also produces an attachment by a capstan effect.

Integration of the lid with the supporting mold 1 and/or with the reinforcing bars can be accomplished, for example, by force fitting, mechanical anchoring, gluing, etc.. Additionally, the furnace 14 can be used, if necessary to perform this integration.

For certain applications, particularly the manufacture of highly flexible tubing, without removal from the mold, sticking between certain cores 16 made of reinforced plastic and at least one of the walls of the groove in which they lie can be prevented so that these cores 16 can have a relative longitudinal displacement relative to shaped mold 1, instead of forming an integral assembly with them that has less flexibility. For this purpose, certain walls of the grooves or certain grooves can be provided with an anti-sticking material of the type described hereinabove.

Conversely, for the bars that are intended to remain integral with the supporting mold 1 or with a portion of the supporting mold 1, a suitable adhesive can be used, for example, SCOTCH-WELD 2216 B/A epoxy adhesive, a registered Trademark of Minnesota Mining and Manufacturing Company, in the proportions recommended by the manufacturer.

To produce the same effect, provisions could be made on the walls of the mold grooves to permit mechanical anchoring and to prevent any relative movement of the cores or bent bars in question.

In certain applications of the shaped bent bars, the adhesion means could be formulated such that beyond a given stress threshold, the cores 16 would no longer stick to the shaped supporting mold 1 or lid.

When a fittable lid is added to the mold 1, depending on its ultimate use, the lid can stick to the top surfaces of some or all the bars and/or the tops of certain internal or external mold partitions.

The bars can also be made to adhere to the lid and the supporting mold 1 can be removed from the bars connected together by the lid, whereupon this assembly can be moved to a storage or use location and the shaped supporting mold 1 recycled.

Whenever it is desirable for the bent bars to be used together with the shaped mold 1 used to manufacture the bent bars, the shaped mold 1 can be made overdimensioned for the specific application.

FIG. 6 provides an example of how this problem can be solved, proposing that the shaped supporting mold 1 be composed of an upper part 19 designed with the ultimate application in mind and lower part 18 which serves as reinforcement during manufacturing of the continuous cores upper part 19, with the whole acting as a new mold. Once the bent bars have been manufactured, since there is no longer any danger of a deformation of the shaped supporting mold 1, the reinforcement 18 can be separated from the upper part 19.

If the shaped mold 1 containing the shaped bent bars is used as such (FIG. 3) or possibly without its support as in the description illustrated by FIG. 6, for this unitized assembly should have an external shape compatible with its ultimate use.

FIG. 7 is an example of the shaped supporting mold 1 having lateral recesses 20 which, during manufacture of sheeting with these shaped molds juxtaposed in the manufacture of reinforced tubing, define together with one adjacent turn a confined space filled with deformable material to ensure tightness. Such shapes are described in French Patent 2,229,913 and corresponding to U.S. Pat. No. 4,013,100.

FIG. 4 shows another example of a supporting mold having a section which allows either self-hooking of this body, for example, to form tubes with adjacent turns by helical winding of the shape, or hooking of complementary parts of two adjacent shapes with adjacent forms adapted for hooking.

It has been suggested, especially in connection with FIG. 2, to remove the shaped supporting mold 1 either directly on the production machine for the bent bars or to remove the same subsequently; however since adding mold removal additives facilitates the shaped supporting mold 1 removal operation, the forces exerted on the shaped supporting mold 1 in order to carry out this operation can in certain cases, for example, when removing a very large number of bent bars from a mold, or when removing bars bent into shapes which are less easily removed from the shaped supporting molds 1, cause permanent deformation of the shaped supporting mold 1, so that the shaped supporting mold 1 must be rejected after several recyclings.

The thickness of the external walls or internal partitions of the shaped supporting mold 1 cannot be increased to overcome this problem because increasing the thickness of the walls, for a given internal deformation, results in an increase in external deformation, and hence to the elastic limit of the material making up the grooved mold is exceeded more quickly.

To preserve the advantages of simultaneously manufacturing several bent bars, the number of shaped bent bars that can be removed from the shaped supporting mold 1 in a single operation can be limited.

FIG. 8 proposes a shaped supporting mold 1 comprising two adjacent parts 21 joined by a means adapted to the force involved in the manufacture of the shaped bars and separated thereafter, possibly upon removal from the shaped supporting mold 1, and which would make it possible to reduce the permanent deformations that reduce the number of times the shaped supporting mold 1 can be recycled.

Depending on whether the shaped bars are or are not to be retained in the shaped supporting mold 1 during their final use, the sections of the grooves which can be varied will be adapted to facilitate removal from the shaped supporting mold 1 by using a slight draft, for example, or to prevent removal by using, for example, rough shapes.

In the laying process of FIG. 10, for bars for manufacturing reinforcing sheets on an elongated body, the shape supporting mold is removed before the bars reach the core 30 of the elongated body. The shaped supporting mold comprises at least as many groove extending longitudinally as the shaped supporting mold 1 contains bars, with the bars being placed inside the grooves, and the sections of the grooves being adapted to those of the bars to limit the movement of the bars. The bars are oriented as they are respectively laid on the elongated body and, if the bars are bent, centers of oscillating radii are all on the same side of the shaped supporting mold.

Until it is desired to separate the bars from the shaped supporting mold, the bars may be maintained in the shaped supporting mold either by temporary integration, for example, by an adhesive, or by obstacles or a wedging whose effect disappears beyond a certain threshold of constraint, or naturally for those that are bent and which are in a support, in which one or more other bars are integrated. The separation of the shaped supporting mold from the bar attached thereto is carried out, for example, by mechanical means using pulling and/or twisting.

It seems that when bars bent in a reinforced stabilizable plastic are produced inside a supporting mold (FIG. 2) it may be sufficient for one bar, such as the central support bar, or several bars, such as the end bars on the support, to be made integral with the support for the other bars to remain in place naturally. The shaped supporting mold, deforming like the integrated bar or bars, follows the movement of the other bars and keeps the bars in their respective grooves despite the forces exerted during stranding or, in other words, the various bars are assumed to have a similar mechanical behavior.

The support grooves can have roughnesses which prevent the bars from escaping, such as, for example, a pinch in the groove at its upper level or opening. Since the shaped supporting mold is elastic, curving the longitudinal axis causes the grooves to open, allowing the bars inside the shaped supporting mold to emerge at a given moment.

According to the preferred embodiment, the bent bars, made of reinforced plastic material are produced inside a shaped supporting mold 1 as described above and simultaneously act as a mold for manufacturing bars and supports for the stranding of the elongated bodies. This supporting mold 1 can be composed of polyamide 11 (generally known by the registered trademark RILSAN) which has the advantage of being suitable for molding and for laying shaped bars, to permit the removal of several shapes at one time and of being reusable if necessary.

The bars, immobilized in the supporting mold 1 but not integral therewith, can be covered with an antiadhesive product such as a mold removal agent of the type currently used in the plastics industry, in order to facilitate removal of the bars when desired.

The armature of the elongated body is laid, in the case of FIG. 10, with the aid of four groups of bars 31 emerging from four unitized assemblies 33. One can easily see that a larger or smaller number of groups of bars or unitized assemblies could be used. This number depends on the number of bars per group and the number of bars comprising the armature.

Unitized assembly 33, composed of bar group 31 and support 32 which keeps them oriented, is stored on supply reel 36. Unitized assembly 33 passes over a guide roller 34 which permits the unitized assembly 33 to keep an essentially constant laying angle for the bars, and to free the bars from their support 32.

Reel 36 is braked in rotation by a suitable means such as, for example, a strap or belt brake to maintain tension on the unitized assembly 33 and the bars. This tension has the particular goal of preventing the bars from becoming entangled and possibly presenting resistance to forces when the supporting mold 32 is removed. This braking means can be adjusted to the tension exerted on the bars and/or the unitized assembly 33.

It is also possible to apply tension to the unitized assembly 33 and/or the bars in another manner, for example by two retarding rollers.

When bar group 31 is held by a roller 34, the supporting mold 32 winds around a sector of roller 34 in order to release the bars with minimum effort and to prevent any deformation of the bars. The bars are removed through the opening of the grooves in the supporting mold 32. These openings are directed toward the space delimited by the bars and not containing the centers of the osculating circles of the bent bars.

Supporting mold 32, once separated from bar group 31, is wound on reel 35 and can easily be recycled, possibly after cleaning, for manufacturing a new unitized assembly 33.

All of the bars, stretched and oriented, required for producing the reinforcing sheet, after having been extracted in bar groups 31 from each of supporting mold 32, are brought toward core 30 where the bars are laid in groups to produce the armature by relative rotation of the bars around the core 30.

In FIG. 10 the core 30 is fixed and the four bar supply assemblies 31, 32, 33, 34, 35, 36 are placed in a supporting cage 37 which is supported by rollers 38 revolving around core 30. It would also be possible to have a fixed cage 37 and a rotating core. The movement of the supporting cage 37 relative to the core 30 is right or left hand twisting, depending on the winding direction.

Figure 11:
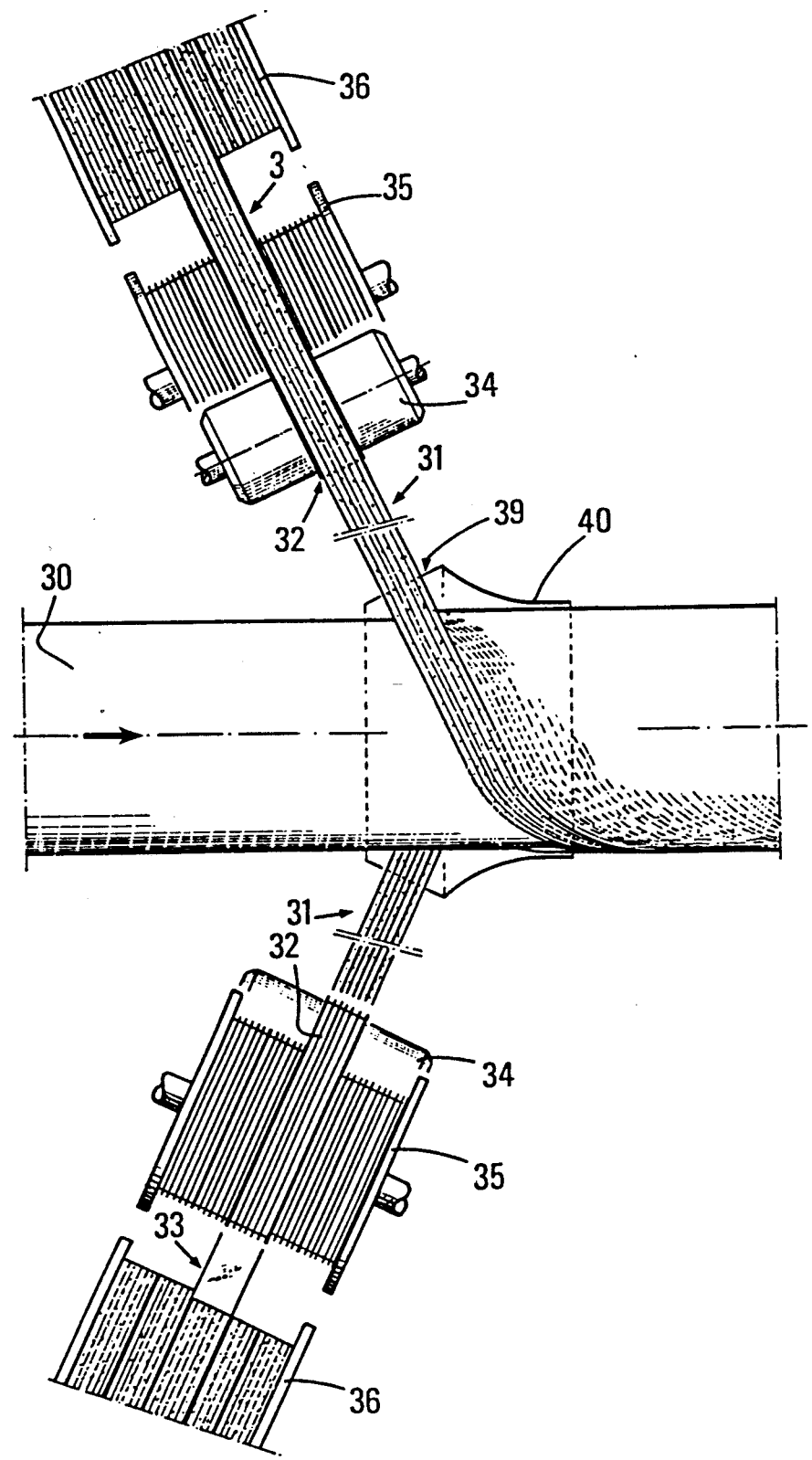
FIG. 11 is a schematic front elevational view illustrating the laying process of FIG. 10.

The bars can also be held together either when they constitute the groups 31 or when they are on the mandrel as, for example, with die 40 shown in FIG. 11.

To permit stranding of the core 30 by the bars arranged in four groups, the core 30 is given an axial translation which permits the bars to be laid over its entire length.

Separating grid 39, placed immediately in front of the place where the bars reach the core 30, ensures correct positioning of the bars with respect to one another and also their correct placement in the reinforcing armature.

The openings in the supporting groups can also be directed toward the centers of curvature of the bars. Consequently, the roller 32 which in FIG. 10 is inside the bars (the interior being the space delimited by the bars and containing the centers of curvature of the bent bars) must be outside the bars (the exterior is the space delimited by the bars and not containing the centers of curvature of the bent bars) and in the same way supporting mold 32 will wrap around a section of roller 34 to allow the bars which are contained in the support to be freed.

FIG. 11 shows an embodiment of a reinforcing armature in which the pitch of the bars is to the right, but one could similarly have a pitch to the left for example by modifying the orientation, relative to the axis of the core 30, of the supply assemblies 31–36 and then modifying the direction of either translation or rotation of the core 30.

In the stranding procedure which is preferred and illustrated in FIGS. 10 and 11, the support bars are freed before the bars reach the core 30. It would not be going beyond the scope of the present invention to remove the bar support once the unitized assembly was placed on the core 30. If the bars are separated before the bars reach the armature, such separation can be done either internally or externally to the bars.

It would not be going beyond the scope of the present invention to bend the groups of bars placed in a support, as could be done with metal reinforcing bars assembled on a support.

The support used for grouping the bars could retain the bars either over their entire length or over certain portions of their length. In the latter case the support is therefore composed of several separate elements which maintain the orientation and grouping of all the bars.

Figure 12:
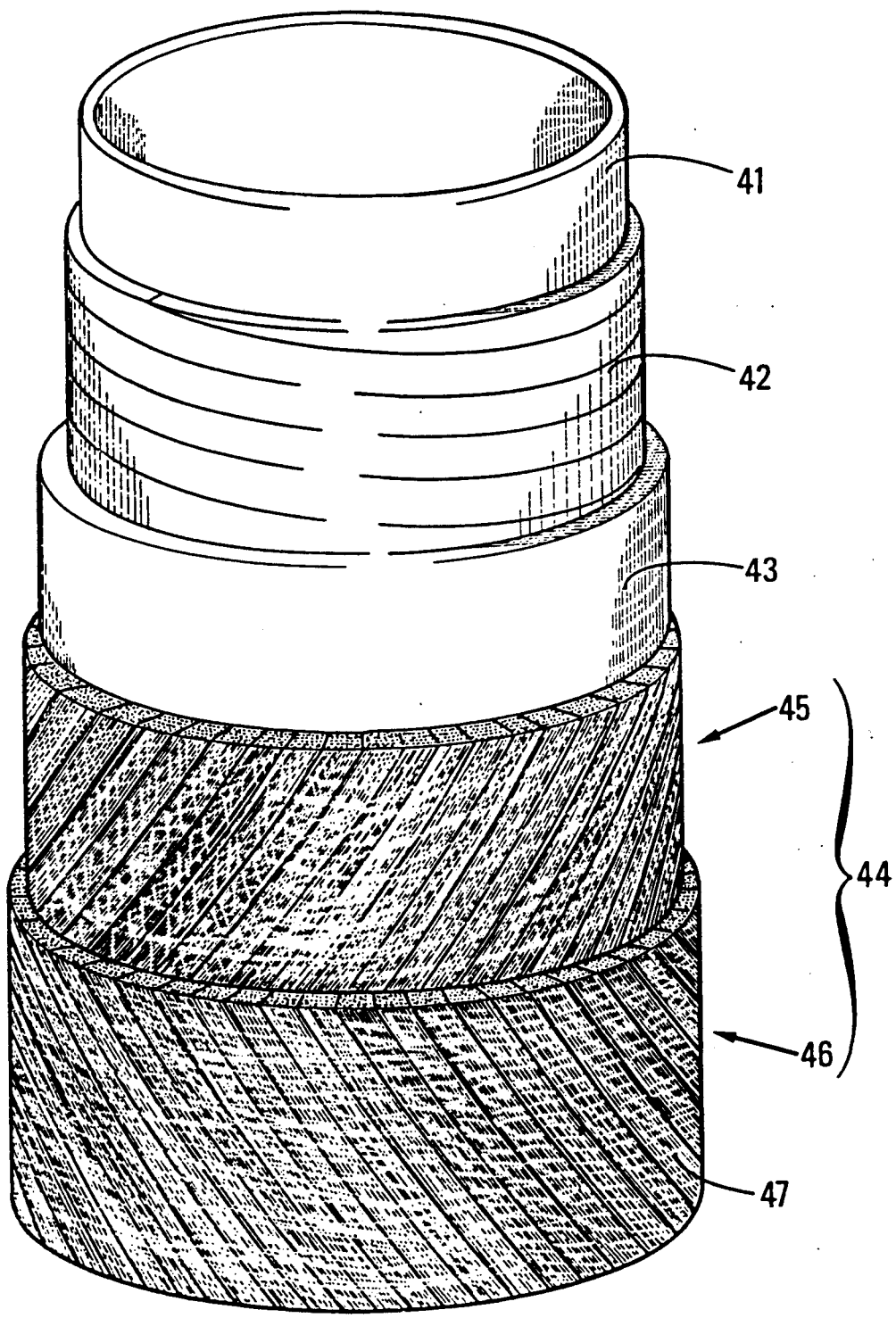
FIG. 12 is a prospective view of a prior art flexible pipe provided with traction-resistant armor.

FIG. 12 shows a type of sealed, flexible pipe which can be subjected to significant tractive effort, in which the armature for traction resistance is made according to the prior art.

In FIG. 12, the pipe is composed, from the interior to the exterior thereof by a flexible internal sheet or tubular core 40 made, for example, of a plastic such as an elastomer. A flexible armature 42 surrounds the tubular core 41 and is resistant to forces created by pressures prevailing inside and outside the flexible pipe. The pipe may be produced, for example, by helical winding, with a shallow pitch, of a self-hooking shape with an S or Z-cross section. A flexible sealed sheet 43, composed of a plastic such as, for example, an elastomer, and a covering armature 42 are provided so that pressure prevailing outside the pipe cannot act directly on the tubular core 41. A traction-resistant armature 44 is composed of two sheets 45 and 47 wrapped helically and in opposite directions with a steep winding pitch.

According to the prior art, each sheet is composed of several wires or strands or, as shown in FIG. 12, preformed shaped bars 47. These shaped bars can, for example, have a S or Z cross section to lend increased stability to the reinforcing sheet which they constitute. French Patent 2.210,266 teaches that the largest dimension of the cross section of these bars, when they are rectangular or arranged along a radius of the flexible pipe, or more generally the moment of inertia of the cross section relative to a perpendicular to the radius passing through the center of gravity, is greater than all the others relative to the lines passing through the center of gravity of the cross section.

Figure 13A:
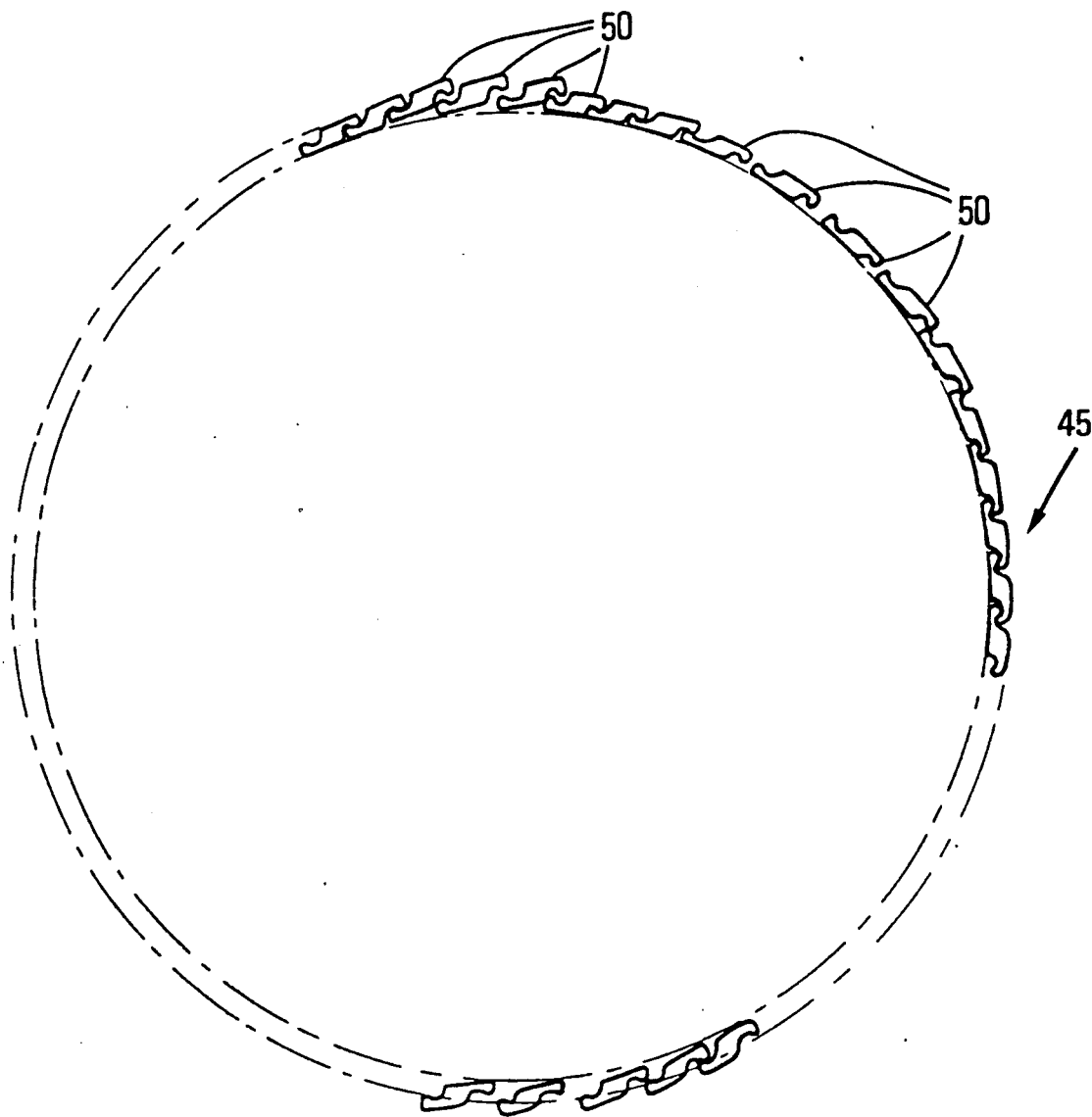
FIG. 13A is a schematic cross-sectional taken along the line IV—IV in FIG. 13 illustrating the positional relationship of shaped bars of one of the sheetings of a traction-resistant armature.

This arrangement makes it possible to prevent the sheet from coming apart during bending tests of flexible reinforced pipes as shown in FIGS. 13 and 13A.

The perspective view of FIG. 13 illustrates a theoretical deformation of one of the shaped bars 47 of a traction-resistant armature when the flexible pipe is subjected to bending stress, notably, during a passage of the flexible pipe around a pulley 48. As apparent from FIG. 13, beneath the neutral fiber 39, shown in phantom line, the generatracies of the flexible pipe are compressed while the length of the generatracies located at the level of the neutral fiber remain unchanged.

It therefore follows, as shown in FIG. 13, that a turn formed by a shaped bar 47, located in the flexion zone, has a winding pitch whose value, compared to the pitch when the pipe is rectilinear, must be less in the compressed zone of the pipe and greater in the zone of extension of the pipe, to a degree which is inversely proportional to the radius of curvature of the pipe.

FIG. 13A shows the separation of self-hooking shapes 50 and not the characteristics of French Patent 2,210,266. In FIG. 13A, only sheet 45 for resistance to tractive force is shown.

With such bars, this instability and the risks of twisting of these shaped bars making up the traction resistant armature can lead first of all to local unhooking of the shapes from one another with no possibility of rehooking them if the bars are hookable to one another (one of the solutions proposed in the prior art), then to separation of the reinforcing sheeting and finally to leakage of the pipes.

To preserve the flexibility of the pipe, such a condition for arrangement implies a larger number of reinforcing bars and, hence, drawbacks related to the manufacture of the bars, the manufacture of the pipes, and their productivity. Thus, the invention is especially valuable for this application which proposes a multi-bar shape which eliminates the drawbacks cited above.

The multi-bar shape comprises a supporting element in which the various reinforcing bars are laid. The bars can be totally or partially or not at all integral with the supporting element.

Immobilization can be produced by any process such as gluing or mechanical anchoring to the supporting element which can be made of flexible plastic.

According to the preferred embodiment, the shape which makes up the armature reinforcing the reinforced bodies comprises reinforcing bars of a composite material and serves both as a mold for their manufacture and as a support for their handling and laying, and does not interfere with the correct function of the bodies reinforced by these multi-bar shapes. Hence, the supporting element comprising the multi-bar shapes will be called the supporting mold.

The multi-bar shapes composed of supporting mold 1 equipped with reinforcing bars 16 are located all around the internal layer of the pipe which is outermost when manufactured, with their bases being directed either toward the inside or outside of the pipe. Of course, the shape could in turn be covered with other sheets, either for reinforcement or for other purposes such as tightness.

The multi-bar shapes can also be used to make reinforcing armatures that are resistant to tractive effort, as well as armatures that are resistant to the effects of the circumferential component of the pressure differential between the interior and exterior of the pipe.

In the pressure-resistant reinforcing sheets as well as those that are resistant to traction, any type of multi-bar shapes could be used, for example those described and illustrated in FIGS. 3, 4, 5, and 7.

It would not be departing from the scope of the present invention if the reinforcing bars were made of a material other than a stabilizable material. One could quite well make elongated bodies with at least one multi-bar shape reinforced with at least one metal bar.

I claim:

1. Process for continuously manufacturing shaped curved reinforcing bars having one of a constant or non-constant cross section, the bars being fashioned of reinforced stabilizable material the process comprising the steps of providing a shaped supporting mold including a plurality of grooves, winding said shaped supporting mold around a mandrel, placing reinforcing elements impregnated with a stabilizable resin in the respective grooves and stabilizing said stabilizable resin over at least a portion of a length of said mandrel, so as to simultaneously produce a plurality of curved bars with shaped sections of the reinforced stabilizable material on said mandrel.

2. Process according to claim 1, further comprising the step of allowing said curved bars in said supporting mold to have a relative displacement with respect to one another.

3. Process according to claim 1, further comprising the step of removing said curved bars from said shaped supporting mold after the stabilization by using said shaped supporting mold to release said curved bars.

4. Process according to claim 1, wherein said stabilizable material is formulated so as to cause said curved bars to adhere to an inside wall of at least one of said grooves.

5. Process according to claim 1, wherein said stabilizable material is formulated such that the bars adhere to inside walls of said grooves.

6. Process according to claim 1, wherein said supporting mold includes two superimposed mold parts, and wherein the process further includes separating one of said two mold parts from the other mold part after at least partially stabilizing the stabilizable resin.

* * * * *